US010133912B1

(12) United States Patent
Bauchspies

(10) Patent No.: US 10,133,912 B1
(45) Date of Patent: Nov. 20, 2018

(54) MULTIPLE MATCH OF TEMPLATE ELEMENTS

(71) Applicant: IDEX ASA, Fornebu (NO)

(72) Inventor: Roger A. Bauchspies, Gustine, CA (US)

(73) Assignee: IDEX ASA, Fornebu (NO)

( * ) Notice: Subject to any disclaimer, the term of this patent is extended or adjusted under 35 U.S.C. 154(b) by 68 days.

(21) Appl. No.: 15/455,121

(22) Filed: Mar. 9, 2017

(51) Int. Cl.
*G06K 9/00* (2006.01)

(52) U.S. Cl.
CPC ............................. *G06K 9/00087* (2013.01)

(58) Field of Classification Search
CPC .................................................. G06K 9/00087
See application file for complete search history.

(56) References Cited

U.S. PATENT DOCUMENTS

| | | | | |
|---|---|---|---|---|
| 7,136,514 | B1* | 11/2006 | Wong | G06K 9/00026 382/124 |
| 7,885,436 | B2 | 2/2011 | Russo et al. | |
| 9,135,494 | B2 | 9/2015 | Boshra et al. | |
| 2009/0212902 | A1* | 8/2009 | Haddock | G06F 21/34 340/5.2 |
| 2009/0320106 | A1* | 12/2009 | Jones | G06Q 20/1085 726/5 |
| 2011/0032074 | A1* | 2/2011 | Novack | G06F 21/32 340/5.53 |
| 2016/0026840 | A1* | 1/2016 | Li | G06K 9/00013 348/77 |
| 2016/0125223 | A1 | 5/2016 | Boshra et al. | |
| 2017/0053108 | A1* | 2/2017 | Jakobsson | H04L 63/0861 |
| 2018/0053062 | A1* | 2/2018 | Zhou | G06K 9/00926 |

OTHER PUBLICATIONS

U.S. Appl. No. 15/455,128, filed Mar. 9, 2017, Roger A. Bauchspies.

* cited by examiner

*Primary Examiner* — Jonathan S Lee
(74) *Attorney, Agent, or Firm* — Patent Law Offices Michael E. Woods; Michael E. Woods

(57) ABSTRACT

A system and method for selectively variably enhancing template matching when testing a pattern-under-test against a pattern template having two or more template elements. A matching process may be configured with a multi-match mode (MM) enabled or disabled. Disabling the MM allows the match process to indicate a match of the pattern-under-test to the pattern template when a single template element is matched (at a standard security mode). Enabling the MM allows a multi-match security mode in which the pattern-under-test must independently match two or more discrete template elements to report that the pattern-under-test matches the pattern template (with an improved security mode relative to the standard security mode).

17 Claims, 2 Drawing Sheets

MULTIPLE MATCH OF TEMPLATE ELEMENTS

FIELD OF THE INVENTION

The present invention relates generally to pattern matching, and more specifically, but not exclusively, to selectively variable security enhancement to template matching when testing a pattern-under-test.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Biometric pattern matching includes use of fingerprints to register or identify a user. A pattern-under-test is compared against some other pattern, such as a preregistered pattern retrieved from a pattern storage such as a trusted data storage. The comparison indicates a "match" or a "no match" condition with further processing sometimes dependent upon that condition. That further processing may result in access to additional resources, or enhanced access to existing resources, or a host of other consequences subsequent to the evaluation of a match or a non-match.

In some systems, the pattern storage may include patterns from multiple sources of patterns. The multiple sources may include different patterns from one user (e.g., fingerprints from different fingers), different patterns from multiple users (index fingerprints of two or more users), or a combination of these examples, among other possibilities.

A system may perform a matching process in which a particular pattern-under-test is compared against individual patterns from a set of patterns in the pattern storage. Each pattern may be defined by a template, and each template may include one or more template elements. When matching a template against a pattern-under-test, some matching engines may test using individual ones of the template elements.

Those matching systems may indicate that a match exists between a pattern-under-test and a particular template when a single template element of the particular template passes a match evaluation process.

There are various measures of a quality of a pattern matching system. These measures may include false acceptance rate and false rejection rate when evaluating a match of the pattern-under-test to a set of templates. These measures of quality may decrease as a physical size of a fingerprint sensor decreases absent careful attention to implementation.

It may be desirable to provide a matching process that may improve one or more measures of quality of a matching process that uses template elements of a particular pattern template when matching that particular pattern template to a pattern-under-test.

BRIEF SUMMARY OF THE INVENTION

Disclosed is a system and method for selectively variably enhancing template matching when testing a pattern template against a pattern-under-test. The following summary of the invention is provided to facilitate an understanding of some of the technical features related to selective variable improvement of measures of quality for a matching engine, and is not intended to be a full description of the present invention. A full appreciation of the various aspects of the invention can be gained by taking the entire specification, claims, drawings, and abstract as a whole. The present invention is applicable to other matching engines and processes in addition to matching test fingerprints against a set of fingerprints registered in a trusted data storage, to other biometric patterns in addition to fingerprints, and to other non-biometric patterns in addition to biometric patterns.

An embodiment of the present invention may include a selectively variable matching process that compares a pattern-under-test against a set of pattern templates retrieved from a template storage wherein each particular template includes two or more template elements used to evaluate whether the particular template matches the pattern-under-test. The matching process may selectively employ a standard mode producing a first measure of quality for the matching process or an enhanced mode (for example, a multi-match mode) producing a second measure of quality for the matching process, the second measure of quality greater than the first measure of quality. The standard mode may evaluate a match between the pattern-under-test and a particular template by finding a single template element of the particular template that matches to at least a portion of the pattern-under-test. The standard mode may terminate the match process upon a first successful match between the pattern-under-test and one template element. The enhanced mode may evaluate a match between the pattern-under-test and the particular template by requiring multiple (e.g., 2, 3, 4, 5, or more) successful matches of different template elements of the particular template against one or more portions of the pattern-under-test. The enhanced mode may terminate the match process upon multiple successful matches between the pattern-under-test and multiple different template elements. When standard mode is enabled, only a single match is required to report a successful match of the particular template, at a standard measure of match quality, to the pattern-under-test. When the enhanced mode is enabled, only a requisite number of successful matches between the pattern-under-test and multiple different template elements will result in a report of a successful match of the particular template, at an enhanced measure of match quality greater than the standard measure of match quality, to the pattern-under-test. Successful matches of a number of template elements, less than the required number, to the pattern-under-test results in a report of an unsuccessful match when enhanced mode is enabled. This is true even when one or more, but less than the requisite number, of template elements are matched against the pattern-under-test.

A computer-implemented method for matching a pattern-under-test to a pattern template, the pattern template including a set of two or more template elements executing, by at least one processor, instructions recorded on a non-transitory computer-readable medium, the method including: a) testing, using the at least one processor, for a match condition between the pattern-under-test and individual template elements from the set of two or more template elements; b) adjusting, using the at least one processor, a match counter each time the match condition is TRUE for a different template element tested in step a); c) reporting, using the at least one processor, a pattern match for the pattern template at a first security mode when both the match counter includes a single match indication and a multi-match mode is not enabled; and d) reporting, using the at least one processor, the pattern match for the pattern template at a second security mode when both the match counter includes a multimatch indication and the multi-match mode is enabled, with the second security mode greater than the first security mode and the multi-match variable value greater than one.

A computer-implemented method for matching a pattern-under-test to a pattern template, the pattern template including a set of two or more template elements executing, by at least processor, instructions recorded on a non-transitory computer-readable medium, the method including: a) initializing, using the at least one processor, a set parameters including a number M, a number N, and a number T with the number M representing a current match count initially equal to zero, the number N representing an index initially equal to one, and the number T representing a number of template elements in the pattern template with T≥2; b) retrieving, using the at least one processor, a pattern-under-test P; c) testing, using the at least one processor, whether the pattern-under-test P matches an Nth template element to produce a match test state, with the match test state affirmative when P matches the Nth template and with the match test state negative when the pattern-under-test P does not match the Nth template wherein M is incremented by one when the match test state is affirmative; d) testing, using the at least one processor, whether M equals one and a multi-match mode (MM) is not enabled to produce a first security mode test state with the first security mode test state affirmative when both M equals one and the MM is not enabled and with the first security mode test state negative when either M does not equal one or the MM is enabled; e) testing, using the at least one processor, whether M equals a multi-match variable and the multi-match mode (MM) is enabled to produce a second security mode test state with the second security mode test state affirmative when both M equals the multi-match variable and the multi-match mode (MM) is enabled and with the second security mode test state negative when either M does not equal the multi-match variable or the MM is not enabled with the multi-match variable≥2; f) incrementing, using the at least one processor, the number N by one to produce an incremented number N; and g) repeating, using the at least one processor, steps c) through f) until the incremented number N is greater than the number T; and h) reporting, using the at least one processor, the pattern-under-test matches the pattern template at the first security mode when the first security mode test state is affirmative; and i) reporting, using the at least one processor, the pattern-under-test matches the pattern template at the second security mode when the second security mode test state is affirmative.

A non-transitory computer-readable medium for matching a pattern-under-test to a pattern template, the pattern template including a set of two or more template elements, including instructions stored thereon, that when executed on at least one processor, perform the steps of: a) testing, using the at least one processor, for a match condition between the pattern-under-test and individual template elements from the set of two or more template elements; b) adjusting, using the at least one processor, a match counter each time the match condition is TRUE for a different template element tested in step a); c) reporting, using the at least one processor, a pattern match for the pattern template at a first security mode when both the match counter includes a single match indication and a multi-match mode is not enabled; and d) reporting, using the at least one processor, the pattern match for the pattern template at a second security mode when both the match counter includes a multimatch indication and the multi-match mode is enabled, with the second security mode greater than the first security mode and the multi-match variable value greater than one.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
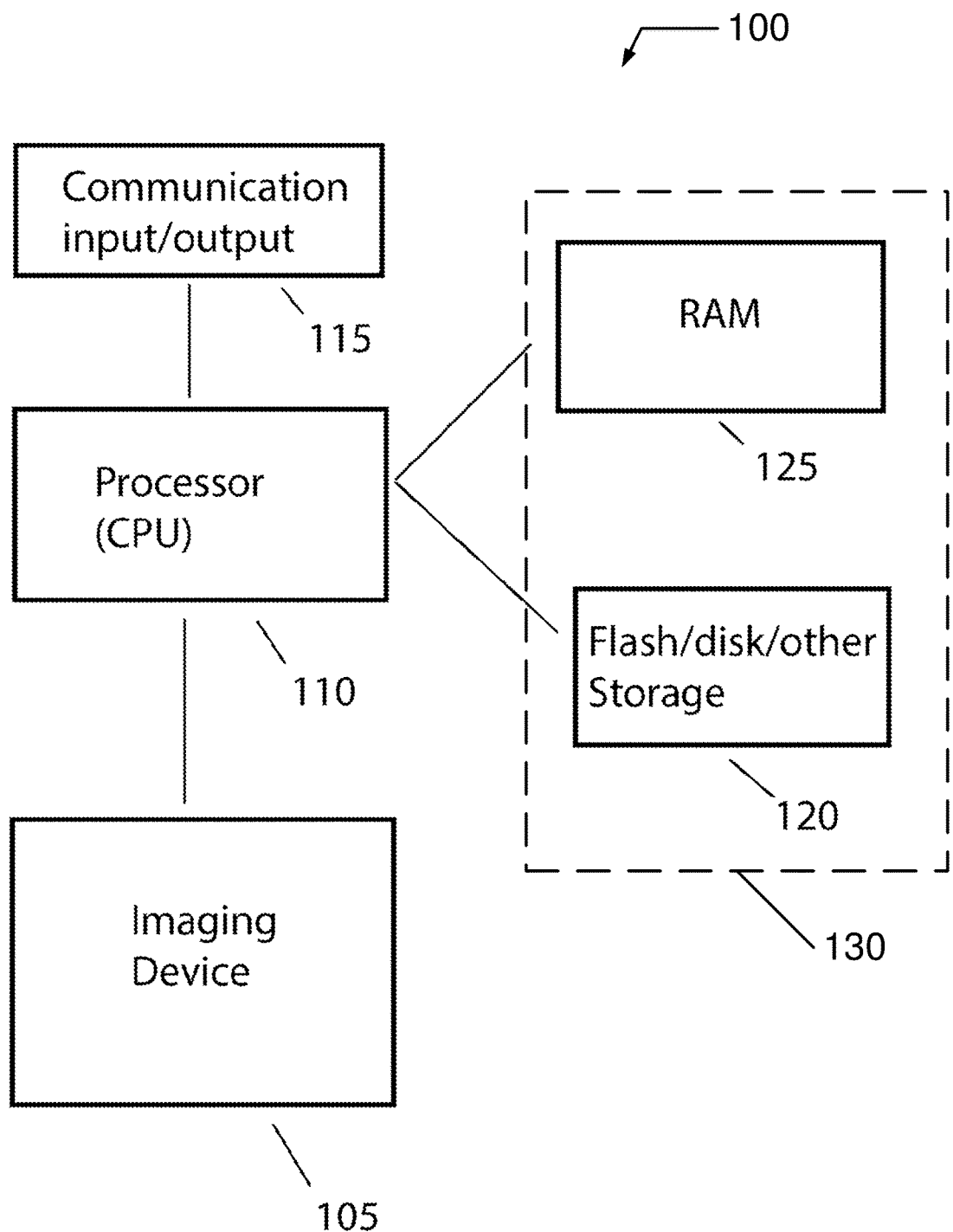
FIG. 1 illustrates a block schematic diagram of an embodiment for a pattern matching system.

Embodiments of the present invention provide a system and method for selectively variably enhancing template matching when testing a pattern template against a pattern-under-test. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "fingerprint" means a map of contrasting amplitude elements from a pattern source. As such, a ridge/furrow pattern on a human finger is included as a fingerprint. Additionally, zebra stripe patterns, retinal vein patterns, or other collections of contrasting amplitude elements having a set of a plurality of sufficiently long succession of similarly contrasted elements.

As used herein, the terms "correlate," "correlating," and "correlated" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression without a match between the first pattern and the second pattern. Correlation is found by matching intermediate patterns that provide a bridge between the first pattern and the second pattern. For example, a second pattern may not match the first pattern, but may match a third pattern, with the third pattern matching the first pattern. Correlation may be found by one or more intermediate matches between the second pattern and the first pattern.

As used herein, the terms "match," "matching," and "matches" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression. A match does not require 100% commonality of features between the first and second patterns. One hundred percent, and nearly 100% (for example 95% commonality—depending upon application), commonality is referred to as a duplicate image. This results when the user places the same portion of the same finger on the sensor from two or more impressions. Sometimes a match is a determination from a matcher process or matcher engine, and sometimes it may include a positive comparison including correlation of a pair of patterns, which can have a particular special meaning. Some embodiments of the present invention include just such a matcher process. However, the present invention is not constrained to determining matches in this fashion; the present invention includes use of an alignment engine for evaluating the condition of a match or a non-match between comparisons of a set of patterns.

As used herein, the terms "near realtime" refers to a practicality of a time delay introduced, by automated data processing or data transmission, between an occurrence of an event of receiving a pattern impression from application of a pattern source to a pattern impressioner (e.g., an imager to create a bitmap image of a portion of a pattern associated the pattern source) and the subsequent processing of data for that pattern impression (e.g., a bitmap image), such as for display, feedback, or control purposes. Depending upon a processing speed, it may be possible to make multiple pattern impressions before a first pattern impression is processed. Some embodiments of the present invention process serial pattern impressions from a user in realtime or near realtime which may be considered equivalent when the processing delay is imperceptible to a user. For realtime, and near realtime embodiments, it is considered that pattern impressions are taken and processed serially, that is an impression and processing/feedback is provided before a next following pattern impression is processed.

As used herein, the term "template" or pattern template refers to a representation of a single pattern by a pattern processing system or method. When the pattern processing system or method is processing a single pattern, a single template is implicated. Similarly, the pattern processing system or method may include multiple templates when multiple different or multiple discrete patterns are implicated.

As used herein, the term "template element" is a constituent element of a template. Different pattern processing systems and methods may represent a pattern in a template in different ways which may affect how the template is constituted, and thus impact what is included as a constituent element. A template is, collectively, represented by all the template elements of that template. For example, a template for a fingerprint may include a set of different portions of that fingerprint. In some cases a template element may include abstractions or content derived or extracted from some or all of the other constituent elements.

In general, a pattern source (e.g., a finger) may include a pattern (e.g., a fingerprint). For a system that does not process the pattern (fingerprint) directly, the system may process a representation (e.g., a pattern map) of the pattern (fingerprint). When a user uses an impressioner (e.g., places a pattern source (finger) on a sensor or imager or other impression producing structure), the system may produce an impression (e.g., an image) of a portion of the pattern (fingerprint) of the pattern source (finger) of the user. After registration during operation when receiving pattern information, the system and method may not, and typically does not, have a priori knowledge that an incoming set of pattern information is in fact from the pattern. To reflect this, any pattern providing the incoming set of pattern information may be referred to as a pattern-under-test. Impressions (images) may be collected and evaluated, in bulk or in realtime or in near realtime from one or more patterns-under-test depending upon a particular implementation.

The pattern storage includes a set of stored patterns that are tested against during system operation. Each stored pattern may each be defined by a pattern template, one such template for each stored pattern. Each template in turn includes a number of template elements. For some implementations, the matching system may be configured to test whether the pattern-under-test matches any specific pattern of the set of stored patterns by evaluating whether a template element of that specific pattern matches to the pattern-under-test. In that configuration, the matching system may stop upon detection of a first match condition.

In some cases, such a configuration for a matching system may produce a quality of match metric (e.g., a false acceptance rate or a false rejection rate) with a particular value producing a security mode for the system. In some cases, it may be desirable to selectively enhance the security mode for the system (e.g., reduce the false acceptance rate)

In those cases, the system may be operated in a multi-match security mode which simply and efficiently reduces the false acceptance rate. The multi-match security mode may be implemented by use of a multi-match process that requires that multiple distinct template elements of a particular pattern template match against a pattern-under-test before the match process is able to report a successful match of the template against the pattern-under-test. Some implementations may allow the system to be switched between the standard security mode (e.g., a single template element matching to the pattern-under-test) and the multi-match security mode (e.g., the multi-match of distinct template elements each independently matching to the pattern-under-test). Other implementations may allow a configuration where either the standard security mode or the multi-match security mode is enabled for all future matching events, at least until a future reconfiguration changes the security mode.

FIG. 1 illustrates a block schematic diagram of an embodiment for a pattern matching system 100. System 100 includes an imaging device 105, a processor 110, an input/output (I/O) system 115, a nonvolatile memory 120 and a RAM memory 125, with memory 120 and memory 125 collectively defining a memory system 130. System 100 is described, in the disclosed embodiment, as a fingerprint matching system that may be used as a pattern (e.g., fingerprint) verification system. In a fingerprint verification system, the system attempts to measure a correspondence between a pair of fingerprints (one-on-one) in order to establish, within some level of confidence, whether one pattern source (a finger) is the same or sufficiently close to another pattern source (a finger) that produces the other fingerprint. This is contrasted with an identification system that determines which pattern source (which finger belonging to which person) generated a particular fingerprint. A verification system may be used as an identification system when a decrease in power/speed is acceptable, given fixed resources. A verification system performs better as the quality of the registered images improves.

System 100 may function as a basic computer in implementing the present invention for accessing and processing fingerprints, fingerprint images, and sets of pattern information (e.g., curves) derived from a fingerprint as further described below. Processor 110 may include one or more central processing units (CPUs), selected from one or more of an x86, x64, ARM, or the like, architectures, connected to various other components, such as by a system bus.

Imaging device 105 produces an image of a fingerprint (an impression from an impressioner for example); either directly (e.g., it is a sensor or imager for a pattern source or an artifact from a pattern source) or it accesses a data structure or memory to obtain the image. The image may be of all or a portion of an entire fingerprint. Sometimes a portion of a fingerprint image may appear to be a set of discrete curves. System 100 is a computing system (e.g., an embedded computing system, a general purpose computing system, a special purpose computing system, combinations thereof, including a stored program computing platform with a processor and a coupled memory storing executable instructions) having a large number of suitable implementations for accessing and processing resources fingerprints, fingerprint images, portions of fingerprint images, and sets of curves derived from a fingerprint. Sensors that may be used with system 100 include charge-coupled devices (CCD), complementary metal oxide semiconductor (CMOS), capacitive, thermal, optical, electro-optical, RF modulation, acoustic, or other image sensing devices, such as those available from a wide range of manufacturers including IDEX ASA, Fujitsu, Atmel, Apple, Synaptics, Infineon, Sony, Integrated Biometrics, and Fingerprint Cards for example. Image arrays may be relatively small (e.g., 50×50 pixels, 128×128 pixels to a CIF size of 352×288 pixels or larger), each pixel having a pixel depth of but not limited to eight bits. System 100 uses a fingerprint image produced from device 105. In some cases, device 105 may preprocess images, such as performing image keystone corrections (a geometric correction used to account for optical distortions associated with optical/prism based systems when returning an image size proportionate to fingerprint size or image reconstruction to assemble an image taken in bands as a finger is 'swiped' across the sensor.

An operating system runs on processor 110, providing control and coordinating the functions of the various components of system 100. The operating system may be one of the commercially available operating systems such as Microsoft (e.g., windows), Apple (e.g., IOS or Mac OS X), Google (e.g., Chrome or Android), as well as UNIX and AIX operating systems, though some embodiments may use a custom control for providing minimal, tailored functions. Custom programs, controlled by the system, include sets of instructions executable on processor 110 that may be moved into and out of memory. These sets of instructions, when executed by processor 110, perform the methods and automated machine-implemented processes described herein. Device 105, I/O communication system 115, and memory system 130 are each coupled to processor 110 via a bus and with memory system 130 including a Basic Input/Output System (BIOS) for controlling the basic system functions.

I/O system 115 interconnects system 100 with outside devices or networks, enabling the system to communicate with other such systems over a communications system (e.g., directly wired, Local Area Network (LAN) or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. I/O devices may also be connected to the system bus via I/O system 115. A keyboard, a pointing device (e.g., mouse, trackball or other device) and a display or indicator may be interconnected to system 100 through I/O system 115. It is through such input devices that the user may interactively relate to the programs for manipulating the resources, images, subsystems, processes and system according to the present invention. By using the aforementioned I/O devices, a user is capable of inputting information to the system through the keyboard or mouse and receiving output information from the system. System 100 may contain a removable memory component for transferring data, for example images, maps, instructions, templates, or programs.

In use, system 100 processes a set of pattern images from a pattern source (e.g., a fingerprint) to compare and evaluate an image of the pattern source, for example, against a set of patterns stored in and retrieved from memory 130. Optionally, system 100 provides the user with feedback regarding a status and/or a quality of an image reconstruction to aid in realtime impression gathering.

I/O system 115 may optionally include a display, other output or a visualization/audiblization system that supports a visualization graphic derived from a match, a reconstruction image or provides some other indication or signal to the user regarding a state, status, message, or the like from a component of system 100.

Figure 2:
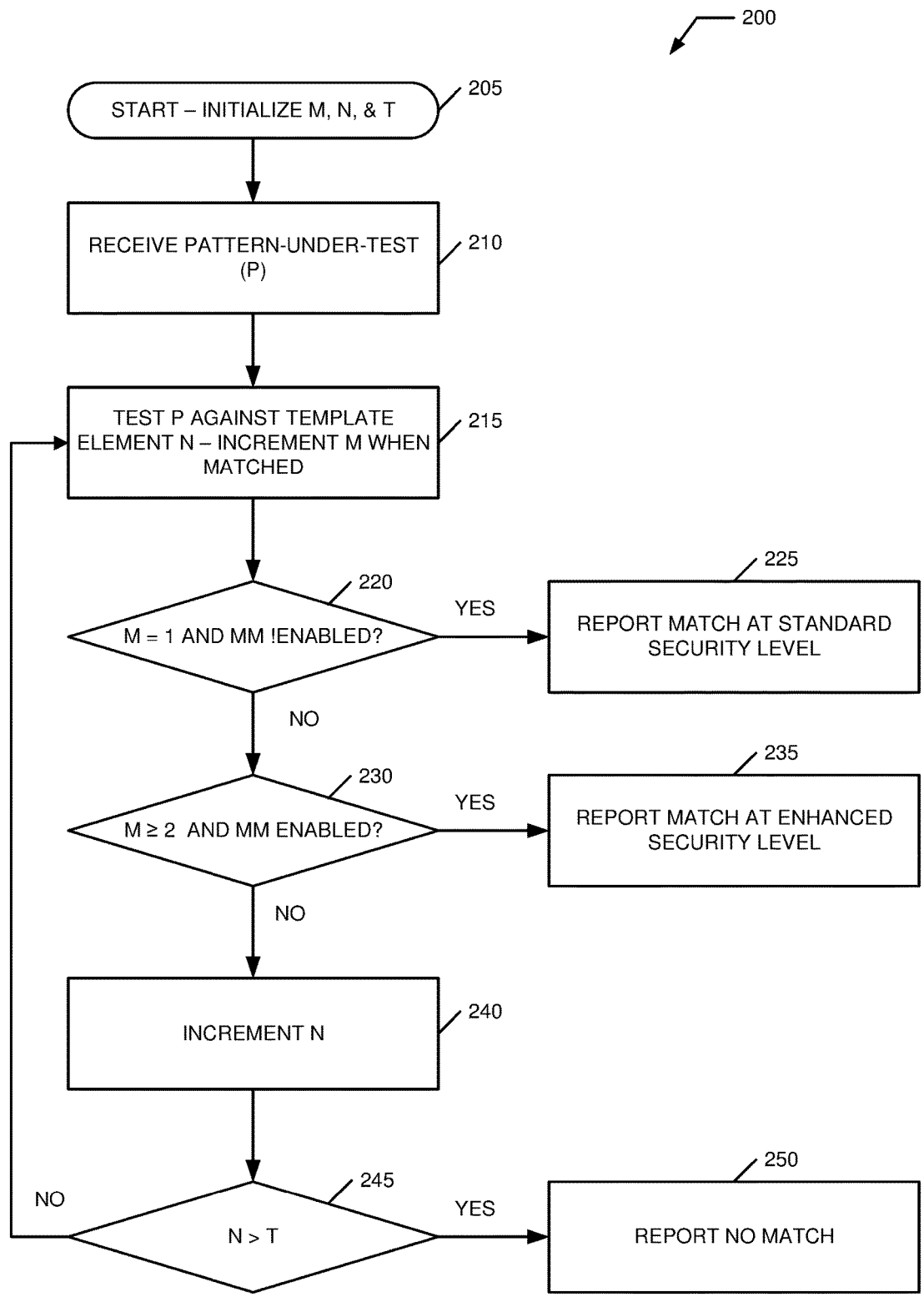
FIG. 2 illustrates a flow diagram of an embodiment for a matching process that selectively enables a multi-match mode having enhanced security for a template matching process.

FIG. 2 illustrates a flow diagram of an embodiment for a matching process 200 that selectively enables a multi-match mode for enhanced security for a template matching process. Process 200 may be executed by system 100 illustrated in FIG. 1 and includes a set of steps, step 205 through step 250.

Process 200 begins with a step 205 identified herein as "START" which may initialize variables and parameters used by process 200. Step 205 may initialize a parameter M equal to zero, an index N equal to one, and a number T equal to a number of template elements in a particular pattern template, for example T greater than or equal to two. Process 200 may be operated at a standard security mode (a single template element is matched to a pattern-under-test) or at a multi-match security mode (two or more distinct template elements independently matched to a pattern-under-test). In some implementations, process 200 may be configured statically or dynamically to set a desired security mode.

After step 205, process 200 performs a step 210 to access a pattern-under-test (P) to be matched against a specific pattern template. That specific pattern template includes the number T template elements as initialized in step 205.

After step 210, process 200 performs a step 215 which tests whether the pattern-under-test P matches the Nth template element (N=1 as initialized at this point of process 200). When the pattern-under-test P does match the Nth template element, step 215 increments the number M (initialized to 0) by one (e.g., M=M+1). Some implementations of process 200 may not start at one and increment through all template elements until a number of matches are found for the operating mode (e.g., one match for standard mode and multiple matches for multi-match mode) or all template elements have been evaluated without matching to the requisite number of template elements. Process 200 may begin at the max number of template elements and decrement through the set of template elements. Process 200 may employ some other selection paradigm that uniquely selects individual template elements for match until the number of matches are found for the operating mode or all template elements are tested. Preferably any selection process may be used as long as each template element is tested for a match no more than once.

After step 215, process 200 performs a step 220 that tests whether M=1 AND that a multi-match mode (MM) is NOT enabled. When both conditions at step 220 are TRUE, the test is affirmative (e.g., YES) and process 200 performs a step 225.

Step 225 reports that the pattern-under-test matches the specific template (at a standard security mode) and process 200 may terminate after reporting. Optionally, process 200 may, such as at step 225, report which of the template elements were matched.

When either, or both, conditions of step 220 are FALSE, the test at step 220 is negative (e.g., NO) and process 200 performs a step 230 which tests whether M≥2 AND that MM is enabled. When both conditions of step 230 are TRUE, the test is affirmative and process 200 next performs a step 235.

Step 235 reports that the pattern-under-test matches the specific template (at a multi-match security mode) and process 200 may terminate after reporting. Optionally, process 200 may, such as at step 235, report which of the template elements were matched.

When either, or both, conditions of step 230 are FALSE, the test at step 230 is negative and process 200 performs a step 240 which increments index N (e.g., N=N+1).

After step 240, process 200 performs a step 245 which tests whether index N is greater than the number T of template elements.

When the test as step 245 is negative, process 200 returns to step 215 and tests a new template element responsive to the incremented number N. Process 200 continues to repeat step 215 through step 245 until the test at step 245 is affirmative or some other termination event has occurred as described herein.

When the test at step 245 is affirmative, process 200 performs a step 250 which reports that the pattern-under-test does not match the specific pattern template. Process 200 may terminate after the reporting of step 250.

As illustrated, process 200 includes MM having a multi-match variable X equal to two. The multi-match variable determines how many distinct template elements must be independently matched to the pattern-under-test for process to report a successful match at a multi-match security mode. For a given matching process, assuming that the standard security mode has a false acceptance rate (FAR) of 1 in K, then the multi-match security mode has a FAR that is directly related to 1 in K^X. As K for the standard security mode increases, the FAR for the multi-match security mode declines rapidly and may become exceptionally good, particularly given that the improvement may result from requiring that X=2 (enhanced) rather than X=1 (standard) in process 200.

In some embodiments, X may be greater than 2. This may be implemented by having several security modes (e.g., X number of security modes and X−1 tests similar to step 230 to test for each desired security mode) or having a pair of security modes similar to that identified in FIG. 2 except that the test at step 230 would include a different condition M≥X rather than M≥2.

Process 200 may establishes a match of a pattern-under-test to a single pattern template. In some systems, process 200 may be used multiple times, for example any time that system 100 evaluates a match of a pattern-under-test to each pattern template of a set of pattern templates.

Also, an article of manufacture for use with a computer processor, such as a CD, pre-recorded disk or other equivalent devices, could include a computer program storage medium and program mechanisms recorded thereon for directing the computer processor to facilitate the implementation and practice of the above described methods. Such devices and articles of manufacture also fall within the spirit and scope of the present invention.

The invention may be implemented in numerous ways, including for example as a method (including a computer-implemented method), a system (including a computer processing system, general purpose, special purpose, hybrid, embedded, and the like), an apparatus, a computer readable medium, a computer program product, a graphical user interface, a web portal, or a data structure tangibly fixed in a computer readable memory. Several embodiments of the present invention are discussed herein. The appended drawings illustrate only typical embodiments of the present invention and therefore are not to be considered limiting of its scope and breadth. The system, methods, and computer-program products have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

System 100 may include a computer program product or software that is stored on or in a non-transitory processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, the software can include a plurality of modules for performing system tasks such as performing the methods previously described herein. A processor interprets instructions to execute the software, as well as, generates automatic instructions to execute software for system responsive to predetermined conditions. Instructions from both the user interface and the software are processed by the processor for operation of system 100. In some embodiments, a plurality of processors can be utilized such that system operations can be executed more rapidly.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A computer-implemented method for matching a pattern-under-test to a pattern template, the pattern template including a set of two or more template elements executing, by at least one processor, instructions recorded on a non-transitory computer-readable medium, the method comprising:
   a) testing, using the at least one processor, for a match condition between the pattern-under-test and individual template elements from the set of two or more template elements;
   b) adjusting, using the at least one processor, a match counter each time said match condition is TRUE for a different template element tested in step a);
   c) reporting, using the at least one processor, a pattern match for the pattern template at a first security mode when both said match counter includes a single match indication and a multi-match mode is not enabled; and
   d) reporting, using the at least one processor, said pattern match for the pattern template at a second security mode when both said match counter includes a multi-match indication and said multi-match mode is enabled, with said second security mode greater than said first security mode and said multi-match variable value greater than one.

2. The method of claim 1 further comprising:
   e) reporting, using the at least one processor, no pattern match for the pattern template when said pattern match has not been reported at step c) or reported at step d) by a time that all template elements have been tested at step a).

3. The method of claim 1 wherein said multi-match variable value equals two.

4. The method of claim 2 wherein said multi-match variable value equals two.

5. The method of claim 1 wherein said multi-match variable value is greater than two.

6. The method of claim 2 wherein said multi-match variable value is greater than two.

7. The method of claim 1 wherein the pattern-under-test includes a fingerprint, wherein the pattern template relates to a single fingerprint pattern, and wherein each template element of a subset of the template elements of the set of two or more template elements includes a portion of said single fingerprint pattern.

8. The method of claim 1 wherein said adjusting step b) includes incrementing said match counter each time said match condition is TRUE for a different template element tested in step a), wherein said single match indication includes said match counter equaling one, and wherein said multimatch indication includes said match counter at least equaling said multi-match variable value.

9. The method of claim 1 wherein said testing step a) includes a termination condition, said termination condition including a single match at said first security mode and including a multiple match at least equal to said multi-match variable value at said second security mode, further comprising:
   e) terminating, using the at least one processor and responsive to said termination condition including a TRUE value, steps a)-d).

10. The method of claim 9 wherein said testing step a) identifies a set of matching template elements, each matching template element of said set of matching template elements matching to the pattern-under-test and wherein said reporting steps each include reporting said set of matching template elements.

11. A computer-implemented method for matching a pattern-under-test to a pattern template, the pattern template including a set of two or more template elements executing, by at least processor, instructions recorded on a non-transitory computer-readable medium, the method comprising:
   a) initializing, using the at least one processor, a set parameters including a number M, a number N, and a number T with said number M representing a current match count initially equal to zero, said number N representing an index initially equal to one, and said number T representing a number of template elements in the pattern template with T≥2;
   b) retrieving, using the at least one processor, a pattern-under-test P;
   c) testing, using the at least one processor, whether said pattern-under-test P matches an Nth template element to produce a match test state, with said match test state affirmative when P matches said Nth template and with said match test state negative when said pattern-under-test P does not match said Nth template wherein M is incremented by one when said match test state is affirmative;
   d) testing, using the at least one processor, whether M equals one and a multi-match mode (MM) is not enabled to produce a first security mode test state with said first security mode test state affirmative when both M equals one and said MM is not enabled and with said first security mode test state negative when either M does not equal one or said MM is enabled;
   e) testing, using the at least one processor, whether M equals a multi-match variable and said multi-match mode (MM) is enabled to produce a second security mode test state with said second security mode test state affirmative when both M equals said multi-match variable and said multi-match mode (MM) is enabled and with said second security mode test state negative when either M does not equal said multi-match variable or said MM is not enabled with said multi-match variable≥2;
   f) incrementing, using the at least one processor, said number N by one to produce an incremented number N; and g) repeating, using the at least one processor, steps c) through f) until said incremented number N is greater than said number T; and h) reporting, using the at least one processor, the pattern-under-test matches the pattern template at said first security mode when said first security mode test state is affirmative; and i) reporting, using the at least one processor, the pattern-under-test matches the pattern template at said second security mode when said second security mode test state is affirmative.

12. The method of claim 11 further comprising:

j) testing, using the at least one processor, whether said incremented number N is greater than said number T to produce a termination test state with said termination test state negative when said incremented number N is not greater than said number T and with said termination test state affirmative when said incremented number N is greater than said number T; and k) reporting, using the at least one processor, the pattern-under-test does not match the pattern template at any of said security modes when said termination test state is affirmative and none of said security mode test states were affirmative during execution of steps d) and e).

13. The method of claim 11 wherein said multi-match variable equals two.

14. The method of claim 12 wherein said multi-match variable equals two.

15. The method of claim 11 wherein said multi-match variable value is greater than two.

16. The method of claim 12 wherein said multi-match variable value is greater than two.

17. A non-transitory computer-readable medium for matching a pattern-under-test to a pattern template, the pattern template including a set of two or more template elements, comprising instructions stored thereon, that when executed on at least one processor, perform the steps of:

a) testing, using the at least one processor, for a match condition between the pattern-under-test and individual template elements from the set of two or more template elements;

b) adjusting, using the at least one processor, a match counter each time said match condition is TRUE for a different template element tested in step a);

c) reporting, using the at least one processor, a pattern match for the pattern template at a first security mode when both said match counter includes a single match indication and a multi-match mode is not enabled; and d) reporting, using the at least one processor, said pattern match for the pattern template at a second security mode when both said match counter includes a multi-match indication and said multi-match mode is enabled, with said second security mode greater than said first security mode and said multi-match variable value greater than one.

* * * * *